US00RE37723E

(19) United States
(12) Reissued Patent
Goren

(10) Patent Number: US RE37,723 E
(45) Date of Reissued Patent: Jun. 4, 2002

(54) INTERACTIVE VIDEO AND AUDIO DISPLAY SYSTEM NETWORK INTERACTIVE MONITOR MODULE INTERFACE

(76) Inventor: Michael Goren, 17 Dublin Dr., Niskayuna, NY (US) 12309

(21) Appl. No.: 09/621,230

(22) Filed: Jul. 20, 2000

Related U.S. Patent Documents

Reissue of:
(64) Patent No.: 5,782,642
Issued: Jul. 21, 1998
Appl. No.: 08/574,742
Filed: Dec. 19, 1995

(51) Int. Cl.[7] ..... G09B 5/00
(52) U.S. Cl. ..... 434/307 R; 434/118; 434/350; 345/2.1; 345/736
(58) Field of Search ..... 434/118, 307 R, 434/308, 323, 169, 350, 362, 365, 156; 340/825.22; 345/1–3, 173, 178, 180, 302, 326–330, 341, 348, 349, 352, 357, 576, 903, 961, 978; 463/31, 46; 361/679–681; 348/14.07, 14.09, 14.11, 585, 587, 596, 599; 380/211, 242; 313/402, 409; 370/490; 379/88.13, 93.25, 93.12, 902; 704/1, 3, 276; 705/1, 43; 706/924, 927; 707/501, 512, 513, 525; 709/206, 218; 725/24, 32, 78, 82, 87, 88, 92, 93, 98, 100, 106, 114–119, 131, 134

(56) References Cited

U.S. PATENT DOCUMENTS 4,542,903 A * 9/1985 Yokoi et al. ..... 463/31
4,622,013 A * 11/1986 Cerchio ..... 434/118
4,792,720 A * 12/1988 Takenaka et al. ..... 313/409
4,896,347 A * 1/1990 Auber ..... 379/93.25
5,027,400 A * 6/1991 Baji et al. ..... 725/116
5,109,482 A * 4/1992 Bohrman ..... 345/328
5,208,665 A * 5/1993 McCalley et al. ..... 725/119
5,228,859 A * 7/1993 Rowe ..... 434/118
5,247,347 A * 9/1993 Litteral et al. ..... 725/114
5,302,132 A * 4/1994 Corder ..... 434/156
5,305,195 A * 4/1994 Murphy ..... 705/1
5,318,450 A * 6/1994 Carver ..... 434/336
5,371,532 A * 12/1994 Gelman et al. ..... 725/88
5,385,475 A * 1/1995 Sudman et al. ..... 434/307 R
5,448,263 A * 9/1995 Martin ..... 345/173
5,454,722 A * 10/1995 Holland et al. ..... 434/271
5,523,769 A * 6/1996 Lauer et al. ..... 345/1
5,524,193 A * 6/1996 Covington et al. ..... 707/512
5,530,852 A * 6/1996 Meske, Jr. et al. ..... 709/206
5,537,127 A * 7/1996 Jingu ..... 345/1
5,566,291 A * 10/1996 Boulton et al. ..... 345/326
5,572,643 A * 11/1996 Judson ..... 709/218
5,615,346 A * 3/1997 Gerken ..... 345/341
5,634,018 A * 5/1997 Tanikoshi et al. ..... 345/329
5,657,096 A * 8/1997 Lukacs ..... 348/585
5,673,169 A * 9/1997 Wicks ..... 361/680
5,673,170 A * 9/1997 Register ..... 361/681
5,896,128 A * 4/1999 Boyer ..... 345/327

FOREIGN PATENT DOCUMENTS

JP 1-251128 * 1/1989

* cited by examiner

*Primary Examiner*—Joe H. Cheng
(74) *Attorney, Agent, or Firm*—Fliesler Dubb Meyer & Lovejoy LLP

(57) ABSTRACT

A device for use as an aid to computer users. The device is coupled to an associated personal computer and performs various functions which provide the user with concurrent explanations of running software, searches and multimedia integration without interfering with the functioning of the associated computer or its running software.

70 Claims, 3 Drawing Sheets new

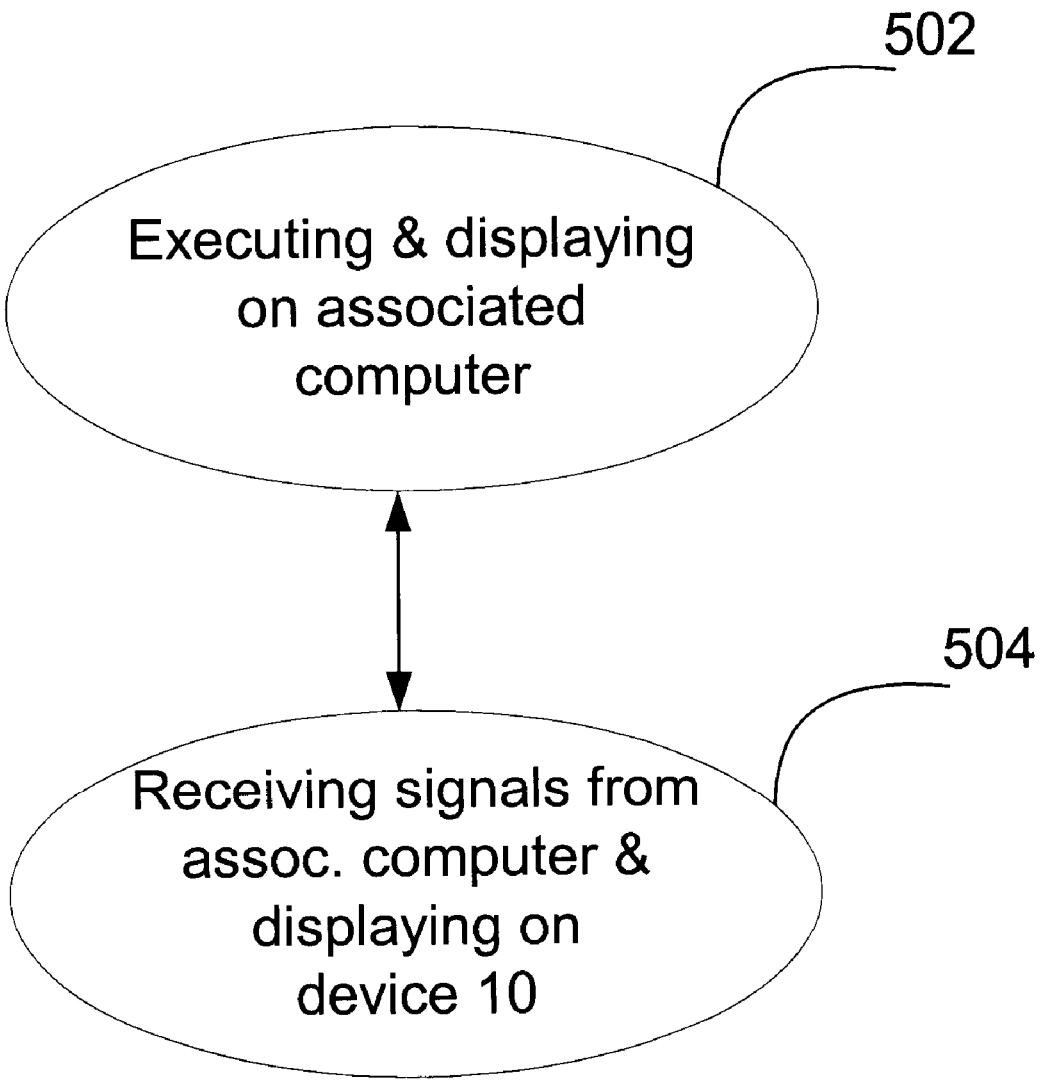
Fig. 5
new

INTERACTIVE VIDEO AND AUDIO DISPLAY SYSTEM NETWORK INTERACTIVE MONITOR MODULE INTERFACE

Matter enclosed in heavy brackets [ ] appears in the original patent but forms no part of this reissue specification; matter printed in italics indicates the additions made by reissue.

BACKGROUND OF THE INVENTION

1. Field of Use

The invention relates to personal computers, and particularly, to an interactive device to aid in use of personal computers. The invention interfaces and has capability for two-way communications and interaction with, and receipt of information, data, images, signals from one or more associated computers, as well as networks, on-line services, the Internet, satellite communications, cable systems, digital delivery systems, databases, servers, video servers, telephone lines, radio signals, television, fiber optic cables, interactive video, CD-ROM and interactive television. The invention is designed to access, retrieve, display, capture, record, store as input, as well as deliver as output, video, images, text, television signals, multimedia, graphics, audio, information, data, digitized information, and support color.

2. Description of Related Art

In recent decades personal computers have become common, significantly enhancing production and reducing costs on many tasks with which they are associated. However, personal computers still have several drawbacks. First, the instruction manuals and software that accompany these devices are frequently large and burdensome, often making tasks take a considerably longer time to accomplish using the computer than they would if done longhand. Second, while explanations are often provided for various software packages "on-line," i.e., while the program is running, often via pull-down menus, these explanations themselves are static and can become burdensome and interfere with the program then running. Third, while such devices often have video or image capability, such capability often slows the computer down and interferes with the current program then running on the computer. Thus, it is desirable to create a device which allows video images to be run and which, concurrently or non-concurrently with video imaging, explains computer software without interfering with a running computer program.

Additionally, with the advent of increased media available on-line, it is desirable to create a device which can access, retrieve, record and store video, audio, digitized information, images, text, graphics, data and other information from remote sources for use by and interaction with an associated computer.

SUMMARY OF THE INVENTION

The present invention is directed to a device to be used with an associated personal computer as a tool or aid to the computer user by performing various functions. These functions include a mentoring function which explains and demonstrates a running computer program, without actually interfering with the program. Additionally, the device can access, interact with, retrieve, record, store, and display digitized information, video, images, graphics, audio, still photography, multimedia, data, text, television signals, and other similar input, manipulate the same concurrently with the associated computer and deliver the input to other similarly configured devices. Further, the device has its own microprocessor and memory, and also performs networking, multitasking and co-processing functions with the associated computer or computer network while also sharing the processing and memory capability of the associated computer.

The device includes a memory, processor, and display, which displays images with television-like precision. The device also includes means for performing mentoring, search, retrieval, recording, storage, and diagnostic functions.

BRIEF DESCRIPTION OF THE DRAWINGS

The invention will be described with respect to particular embodiments thereof, and reference will be made to the drawings in which:

*FIG. 5 is a flow diagram in accordance with an embodiment of the invention.*

DETAILED DESCRIPTION

Generally described, the device in accordance with the invention is a tool to aid in the use of an associated computer (e.g., a personal computer). In aiding the computer user, the device performs several functions including a mentoring function, searching function, and diagnostic function. The mentoring function is utilized for explaining and/or demonstrating particular functions of a software application running on the associated computer without interfering with that software. The searching function is used to search the associated computer, other systems via a network, or the Internet for various information, including audio and video information. The diagnostic function is utilized to diagnose malfunctions in the associated computer. The device is also capable of several other interactive functions, including multimedia integration. Each of these functions is described more fully below.

Figure 1:
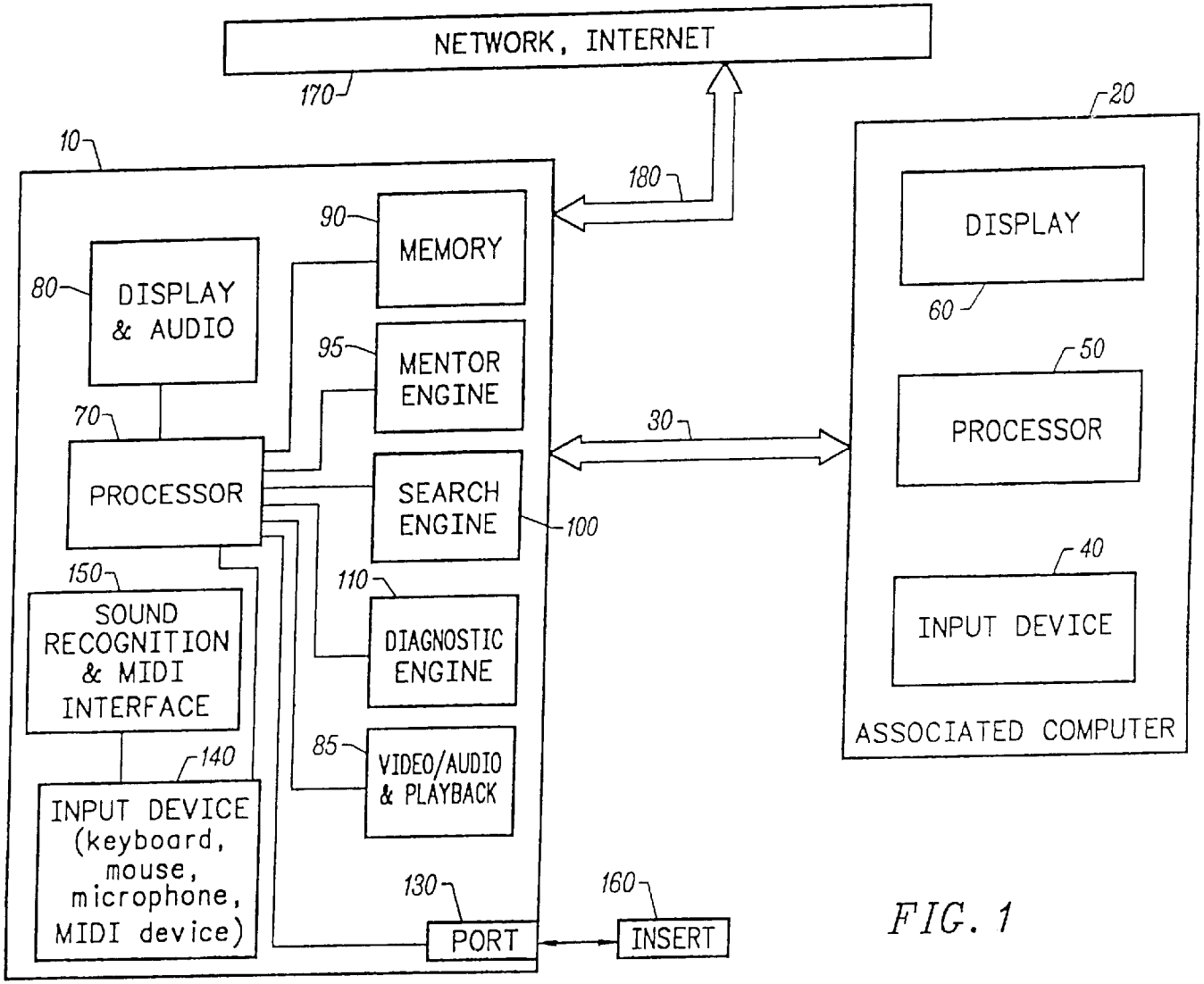
FIG. 1 is a representational block diagram of an embodiment in accordance with the present invention.

Referring to FIG. 1, device 10 is coupled to associated computer 20 via a bidirectional bus 30. Associated computer 20 includes input device 40 coupled to processor 50 coupled to display 60, such that associated computer 20 is capable of running a computer program. Device 10 includes a processor 70 coupled to a display 80. In addition, processor 70 is coupled to each of a memory 90 (which includes RAM and ROM), a video/audio recorder 85, a mentor engine 95, a search engine 100, a diagnostic engine 110, a peripheral port 130, and an input device 140. Input device 140 includes, in alternative embodiments, a keyboard, a mouse, and/or a microphone. Input device 140 is also coupled to sound recognition circuitry 150 which enables the device to recognize a voice or music.

While device 10 includes processor 70 and memory 90, the processor and memory size on device 10 can be minimized by giving device 10 access to the microprocessor and memory as well as the hard disk (not shown) CD ROM (not shown) and floppy disk drives (not shown) on associated computer 20 and creating a "sharing" situation. Such processing and memory can be accomplished in a similar manner to that presently used in conventional multitasking techniques or in conventional RAM/ROM sharing.

Device 10 is also provided with its own operating system and can run some software applications independently of associated computer 20. Mentoring Function Device 10 performs a mentoring function through mentor engine 95, which, in alternative embodiments, may be hardware, software, and/or firmware. That is, for any given program being run on the associated computer 20, the device 10 can navigate options, explain alternatives, and demonstrate each alternative and its consequences. Software programs, while running on the associated computer or server or imported from the Internet, *step 502* (*FIG. 5*), communicate with the device 10 to convey information to the device simultaneously and in parallel with the running of the program via bidirectional bus 30. Communication also occurs in the opposite direction, from device 10 to associated computer 20. Conventional network software is utilized to operate bus 30 so that the device 10 and the associated computer 20 are operating like a LAN. Information is passed between computer 20 and device 10 via bus 30 in a manner similar to conventional e-mail and/or file sharing. Video-type images then appear on the device display 80, *step 504* (*FIG. 5*), and act as an extension of the programs running on the associated computer 20. The images are designed to provide explanations, describe the capabilities of the computer program, and demonstrate effective strategies for using the program. Thus a dynamic interaction is achieved between the video-type images on the device 10 and the software program on the computer 20 with minimal interruption of the computer program running. For instance, with a spreadsheet program, each formula or function can be described and demonstrated on the screen, display or monitor 80 of the device 10. This demonstration occurs in the manner of instructional video appearing on the device 10 correlated to the specific formula or function that the user of the spreadsheet program is performing on the associated computer 20. Such demonstration occurs virtually free of interference with the running spreadsheet program.

In addition, the capability of the particular software being run could be demonstrated, at the askance of the user, without the need to read through manuals. In the same way that spreadsheet software recognizes formulas and then processes the data given for the formula to achieve a result, the device also recognizes such formulas, once communicated to it, for the purpose of demonstrating and explaining the formulas and alternatives on the device 10 in a real time, dynamic and interactive manner. Further, computer models can be built by a user in an interactive manner using the graphics incorporated into the spreadsheet program. Video-like images are produced to describe the formulas and explain their use and their results, as well as providing alternative formulas. The true capability of the spreadsheet programs can be demonstrated on the device 10 using little to no memory of the computer 20 and without disturbing the running of the software program on computer 20, unlike conventional user access in a static manner of the "Help" menu or pull-down menus of the running program.

For multitasking functions and for integrating cross-applications of more than one software program, the device 10 will navigate the user through the complexities of integration with demonstrations and explanations in the form of instructional videos comprised of demonstration of the exact functions desired by the user in integrating two programs. The device 10 demonstrates how integration is accomplished and explains the steps concurrently with the user performing the work.

The mentoring function can be made optional. For instance, in one embodiment of the present invention, the software running the application on the associated computer would automatically run concurrent video, if requested by the user to be in a concurrent video mode. The user could shut off the concurrent video mode and request a second mode used for demonstration and explanation of specific items only. For example, the user could access a formula on the associated computer 20 by going to an index on a 'HELP' menu or by utilizing hypertext capability to click on key words to find related text, video, audio, graphics, images, or pictures, including, without limitation, related explanations and demonstrations. Upon finding a formula that the user is seeking (such as net present value, internal rate of return, etc.), the user requests the device 10 to run the explanatory video. Such a request occurs in one embodiment, by the user using a mouse input device 140 associated with device 10, to point to and select the desired formula. Otherwise, in the automatic mode, whenever the formula is inserted in the spreadsheet the computer will signal the device to run video on that formula, word, or instructions upon the screen 80 of the device. The same function can be performed with other types of computer programs in addition to spreadsheet programs.

In one embodiment of the invention, rather than storing additional instructions to be sent to the device 10 for informational viewing in parallel with an application program running on the associated computer 20, an insert 160 to be used in conjunction with a particular software package and is inserted into port 130. The insert 160 contains additional information required for the device to implement the mentoring function. The insert snaps into port 130 similarly to additional memory added to a mother board, except that it is inserted externally in port 130.

Alternatively, device 10 is bidirectionally coupled via bus 180 to a computer network and/or the Internet 170 and is used to access additional information or explanations not readily available in associated computer 20, device 10, or insert 160 using the searching function, described below.

Searching Function

The device can perform a searching function using search engine 100 which may be, in alternative embodiments, hardware, software, and/or firmware. The device can search for, retrieve, record and store data, information, video, audio and images obtained from servers, networks, the Internet, on-line services, interactive television, the associated computer, CD-ROM, video archives, cable television programs, satellite television programs, video servers or databases to find particular helpful information, images, or programs.

For instance, one use of the searching capability may include a search for an explanation of the particular software running that is not available from the associated computer 20 or insert 160, but can be obtained from a video server maintained by the producer of the software or others and accessible through on-line servers, the Internet or other similar services.

Such a search can, in one embodiment of the invention, be initiated by the user speaking key words, such as "how" or "why". The device 10 uses a conventional sound recognition system 150 to recognize the words and then to initiate search engine 100. Sound recognition block 150 also operates as a MIDI interface in a conventional manner for retrieving information from a MIDI device operating as input device 140.

The device and its associated computer can also search for other "non-explanatory" data information, digitized information, entertainment programming, television signals, or images from video and/or audio archives, servers, or databases. The user of both the computer and the device can access, search, download and manipulate television libraries, film libraries, news archives, television programs, video, audio, documentaries, digital information, animation, multimedia presentations, graphics, text, three dimensional images, on-line graphics, text, information and images, as well as video-phones, music, entertainment software, still photos and similar media.

Once a search is initiated, either by sound recognition or other input method, (e.g., text input from a keyboard or keypad or instructions from a mouse), the device 10 manages its search via search engine 100 in a manner similar to "LEXIS,"NEXIS", or other full text retrieval systems conventionally operated today.

Search engine 100, which in one embodiment works jointly with associated computer 20, interfaces with on-line services that possess the film libraries, video, media, multimedia presentations, still images, images, text, graphics, television libraries, archives, audio, etc. All of the media are digitized by the owners of the libraries and the user inputs search commands to locate the desired media in a manner similar to conventional full text retrieval techniques, and download it to the device. The media in such libraries can be accessed either by reference to an index, table of contents, list of categories, list of headings, or directly through full media search. The latter means that the user, going on-line can input titles, or any combination or string of text, images, or audio that will be searched by the media library to find the media that contains that string and view the results on the device.

When the user determines that the sought after digitized media has been found, the user can capture it by either 1) recording to the video/audio recorder 85 of the device 10, virtually bypassing associated computer 20, if the information retrieved is in audio or video format or 2) with respect to text or graphics, saving the information to a conventional storage medium (e.g., disk drive) on the device 10 or the associated computer 20.

Typically, when retrieved information is in the form of audio or video, use of video/audio recorder 85 is faster than capturing such media onto computer 20. Video/audio recorder can be, in one embodiment of the invention, conventional video recording equipment (e.g., a VCR-type device). Using the retrieved information, the device 10 and associated computer 20 can be used to manipulate such information to create a desired multi-media product and, if desired, to send it as output to other similarly configured remote devices and associated computers.

Diagnostic Engine

The device 10 is also capable of performing a diagnostic function on the associated computer 20 via diagnostic engine 110 with an explanation of a diagnosed problem, appearing on display 80. The associated computer 20 can also run a diagnostic test for the device 10 as well. This function is accomplished in a manner similar to the manner that a conventional computer can run a diagnostic test on various disk drives.

Cross-Media Integration

The device 10, which in one embodiment includes a high resolution television-quality monitor 80, is further capable of cross-media integration. Text, video, audio, and still images, including those retrieved using the search function, described above, can all be combined into one multi-media document or presentation. Such a presentation can then be displayed on the device's own monitor 80, or two parallel images can be synchronized with one of the images sent to and displayed on the monitor 80 of the device 10 and the other image sent to and displayed on the monitor 60 of the associated computer 20 for simultaneous viewing.

Vivid imagery downloaded to and displayed on the screen 80 of the device 10, (additional to the screen 60 of the associated computer 20) can be useful in many forms. For instance, retailers can download video images from video cameras at their locations onto the device 10, while sending graphics with targeted information onto the associated computer 20. The consumer can locate the product of interest, comparison shop, know the price, expiration date, request more information and order delivery of the product. Corporate presentations with multimedia graphics, text, video, spreadsheets, three dimensional images, animation, audio, and music can all be created, integrated and displayed using the device 10. Graphic arts software, entertainment software, word processing software, music, video, and images sourced from both the computer and remote servers on cyberspace can be created, mixed, manipulated, edited and stored to appear concurrently on the device and associated computer, or to be sent to similar remote devices and associated computers of others.

Two-way communications, graphics and video utilizing the additional display capabilities of the device are much more effective than the single computer monitor in making use of the growing number of stored images available to computer users, multimedia, data, information libraries, archives, video, audio, digitized information, and multitasking capabilities. Devices with high resolution screens, microprocessors, memory, video recording, and command and control capability ("smart screens") associated with computers, enhance interactive capabilities, and interface more effectively with human capabilities, than the computer as presently configured with a single ("dumb") monitor.

For instance, forums, professional groups, special interest groups, marketing groups, securities traders operating from remote trading floors can benefit from real time interactions in a more multidimensional, multimedia and real time fashion with the device than with only a computer screen ("mono-screen"). While running particular software on each of their computers and screens, each participant can use the device for multitasking, locating, retrieving, interacting with, interfacing and manipulating multimedia applications without disturbing the program that is being run on their associated computers.

Other Interactive Applications

Additionally, the device has many other interactive applications. For instance, computer games are enhanced with the device monitor 80, which in one embodiment is a high resolution video screen. For example, in a computer golf game, when a ball is hit by the user on the associated computer screen, the image on the device screen will show a television-quality video of an actual televised scene as the ball lands. In other words, a user can see himself or herself playing golf. Such a function could be implemented in a manner similar to that described above for the mentoring function.

In addition, while running an application on the computer, the device can display an instructor giving actual instruction to the user, related or unrelated to the actual mechanics of the software. The instructor could be live or taped. A configuration of two or more devices, each with its own screen, microprocessor, memory, and command and control capability, and each along with the associated computer (and its CD-ROM), could run computer games and other entertainment software that are presently not feasible to run without an additional higher resolution screen as is part of the device. The images on the screen of the device give users a much more interesting "battlefield", which users participating in the computer game would all have displayed in common on the monitor or screen 80 of the device 10. While the associated computes 20 create scenarios for the game and create graphics and text on the monitors 60 of such computers 20, it would be on the screen 80 of the device 10 that the video action would take place. Each associated computer 20 communicates with the device 10 via bus 30 and sends graphics and text, for better visual effects and a more realistic and exciting game.

Display 80

Figure 2:
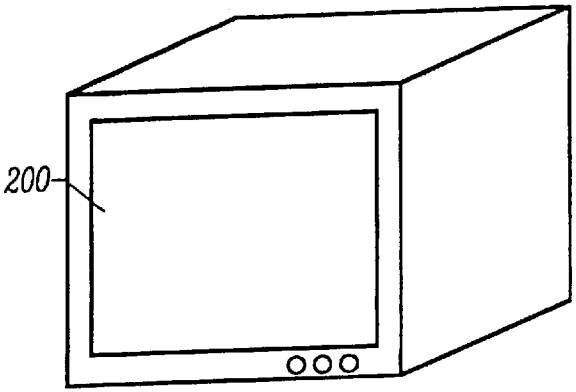
FIG. 2 is a representational diagram of a conventional monitor.
Figure 4:
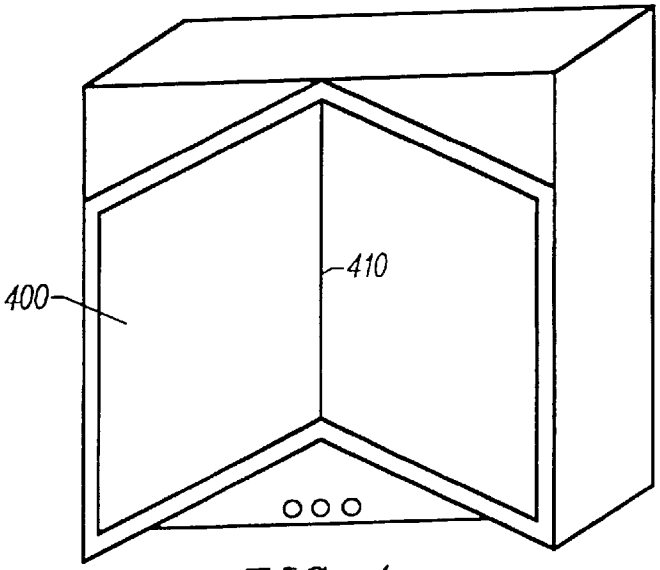
FIG. 4 is a representational diagram of a monitor with a concave surface.
Figure 3:
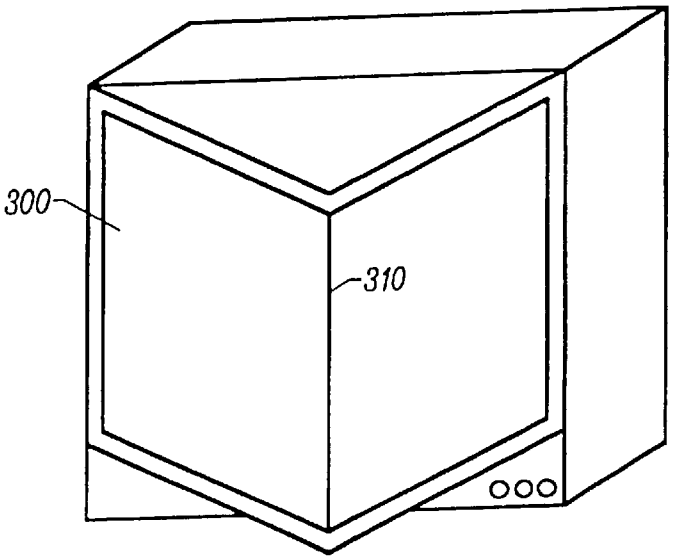
FIG. 3 is a representational diagram of a monitor with a convex surface.

Conventionally, monitor screens on computers are flat and two dimensional, as shown in FIG. 2, and typically display information that also appears two-dimensional. While such a flat screen would be suitable to be used in accordance with the invention, a "three-dimensional" screen is preferred. FIGS. 3 and 4 show a convex and a concave split-screen surface, respectively. The screen, rather than appearing flat and perpendicular to the user, appears to be a half-open book, with the "spine of the binding" in the middle of the screen. In FIG. 3, screen 300 appears convex with the "spine" of the screen 310 toward the user. In FIG. 4 screen 400 has its spine 410 away from the user. Screens, such as those shown in FIG. 3 and FIG. 4, give the appearance of three-dimensionality.

An alternative to physically creating such a convex or concave screen as shown in FIGS. 3 and 4, is to create a three-dimensional appearance on a conventional flat screen using software.

Regardless of the actual shape of the screen, it is preferable that display 80 (FIG. 1) have high-resolution television-quality characteristics as well as an audio output mechanism. Such characteristics enhance the functions of the device and significantly aid the computer user.

The disclosed embodiments of the present invention are intended to be illustrative and not restrictive, and the scope of the invention is limited only by the claims that follow.

What is claimed is:

1. A device comprising:

a first display;

a first processor operatively coupled to said first display;

a memory operatively coupled to said first processor;

input means for receiving input and operatively coupled to said first processor;

bussing means coupled to said device for interfacing with an associated computer having a second processor and a second display;

mentor means, operatively coupled to said first processor, for producing on said first display a first explanation of a first computer program executing on said associated computer; and search means, operatively coupled to said first processor, for searching a server for information and retrieving said information.

2. The device of claim 1, further comprising:

diagnostic means, operatively coupled to said first processor, for diagnosing a problem with said associated computer and displaying a second explanation of said problem on said first display.

3. The device of claim 1, wherein said server is a remote server.

4. The device of claim 1, wherein information includes still images, video images and audio.

5. The device of claim 1, further comprising recording means for recording said retrieved information.

6. The device of claim 1, wherein said first processor is capable of executing a second computer program on said device independent of said first computer program executing on said associated computer.

7. The device of claim 1, wherein said input means includes means for recognizing sounds, including voice and music.

8. The device of claim 1, wherein said input means includes at least one of a keyboard, a mouse, and a microphone.

9. The device of claim 1, wherein said first display includes a split-screen, forming a concave surface.

10. The device of claim 1, wherein said first display includes a split-screen, forming a convex surface.

11. The device of claim 1, wherein said first explanation includes audio, video, and still images.

12. The device of claim 1, wherein said device further includes a port, operatively coupled to said first processor, for receiving an insert carrying specialized information to be utilized in conjunction with said first computer program.

13. The device of claim 1, wherein said search means is for retrieving said information directly into said associated computer.

14. A device comprising:

a first display having an audio output;

a first processor operatively coupled to said first display;

a memory operatively coupled to said first processor;

bi-directional bussing means coupled to said device for interfacing with an associated computer having a second processor and a second display;

mentor means, operatively coupled to said first processor, for producing on said fit display a first explanation of a first computer program executing on said associated computer;

diagnostic means, operatively coupled to said first processor, for diagnosing a problem with said associated computer and displaying a second explanation of said problem on said first display means;

input means, operatively coupled to said first processor, for receiving input, said input means including means for recognizing sounds;

search means, operatively coupled to said first processor, for searching a server for information in response to said input and retrieving said information; and recording means, operatively coupled to said first processor, for recording said retrieved information.

15. The device of claim 14, wherein said input means includes at least one of a keyboard, a mouse, and a microphone.

16. The device of claim 14, wherein said server is a remote server.

17. The device of claim 14, wherein said memory includes RAM and ROM.

18. The device of claim 14, wherein information includes still images, video images and audio.

19. The device of claim 14, wherein said first explanation and said second explanation each include audio, video, and still images.

20. The device of claim 14, wherein sounds include voice and music.

21. The device of claim 14, wherein said first display includes a split-screen, forming a concave surface.

22. The device of claim 14, wherein said first display includes a split-screen, forming a convex surface.

23. The device of claim 14, further including a port, operatively coupled to said first processor, for receiving an insert carrying specialized information to be utilized in conjunction with said first computer program.

24. The device of claim 14, wherein said first display is a high-resolution display.

25. The device of claim 14, wherein said recording means is a video/audio recorder.

26. The device of claim 14, wherein said search means is for retrieving said information directly into said associated computer.

27. A system comprising:

a computer system including a second display, a second input means for receiving input, and a second processor for executing a first computer program; and an interactive device, including:

a first display;

a first processor operatively coupled to said first display;

a memory operatively coupled to said first processor;

first input means, operatively coupled to said first processor, for receiving input;

bi-directional bussing means coupled between said computer system and said interactive device for communicating with said computer system;

mentor means, operatively coupled to said first processor, for producing on said first display a first explanation of said fir computer program; and search means, operatively coupled to said first processor, for searching a server for information and retrieving said information.

28. The system of claim 27, further comprising:

diagnostic means, operatively coupled to said first processor, for diagnosing a problem with said computer system and displaying a second explanation of said problem on said first display.

29. The system of claim 27, wherein said server is a remote server.

30. The system of claim 27, wherein information includes still images, video images and audio.

31. The system of claim 27, further comprising recording means for recording said retrieved information.

32. The system of claim 27, wherein said first processor is capable of executing a second computer program on said interactive device independent of said first computer program.

33. The system of claim 27, wherein said first input means includes means for recognizing sounds, including voice and music.

34. The system of claim 27, wherein said first input means includes at least one of a keyboard, a mouse, and a microphone.

35. The system of claim 27, wherein said first display includes a split-screen, forming a concave surface.

36. The system of claim 27, wherein said first display includes a split-screen, forming a convex surface.

37. The system of claim 27, wherein said first explanation includes audio, video, and still images.

38. The system of claim 27, wherein said interactive device further includes a port, operatively coupled to said first processor, for receiving an insert carrying specialized information to be utilized in conjunction with said first computer program.

39. The system of claim 27, wherein said search means is for retrieving said information directly into said computer system.

40. An interactive device for use with an associated computer, wherein said associated computer includes a second processor, a second input device, and a second display and wherein said associated computer is capable of executing one of a plurality of interactive user applications and displaying on said second display first information, said interactive device comprising:

a first display wherein said second display and said first display are simultaneously viewable by a user;

a first processor operatively coupled to said first display;

a first input device, operatively coupled to said first processor, including at least one of a keyboard, a mouse, and a microphone for receiving a request input from a user;

means, operatively coupled to said first processor, for displaying on said first display in response to said request input second information integrally correlated and dynamically changing with respect to said first information, wherein said second information is different from said first information, and displaying said second information concurrently with the display of said first information, wherein said first information is displayed on said second display in response to one of said plurality of interactive user applications executing on said associated computer.

41. The interactive device of claim 40, wherein said first display operates independent of input received by said second input device.

42. The interactive device of claim 40, wherein said second information includes still images, video images, and audio.

43. The interactive device of claim 42 wherein said second information is retrieved from said associated computer.

44. The interactive device of claim 40, wherein said means for displaying includes a mentor engine.

45. The interactive device of claim 40, further including a search engine, wherein said second information is retrieved from a remote device by said search engine.

46. A device comprising:

a first display;

a processor operatively coupled to said first display;

a memory operatively coupled to said first processor;

an input device operatively coupled to said first processor;

a bus adapted to be coupled to an associated computer having a second processor and a second display;

a mentor engine, operatively coupled to said first processor, to produce on said first display a first explanation of a first computer program executing on said associated computer; and a search engine operatively coupled to said first processor.

47. The device of claim 46, further comprising:

a diagnostic engine operatively coupled to said first processor.

48. The device of claim 46, wherein said search engine is for searching for and retrieving information from a remote device.

49. The device of claim 46 wherein said search engine is searching for and retrieving information from said associated computer.

*50. An interactive device for use with an associated computer, wherein said associated computer includes a second processor, a second input device, and a second display, and wherein said associated computer is capable of displaying on said second display first information, said interactive device comprising:*

*a first display, wherein said second display and said first display are simultaneously viewable by a user;*

*a first processor operatively coupled to said first display;*

*a first input device, operatively coupled to said first processor, including at least one of a key entry device, a pointing device, and an audio input device for receiving a request input from a user; and*

*means, operatively coupled to said first processor, for displaying on said first display in response to said request input second information integrally correlated and dynamically changing with said first information, wherein said second information is different from said first information, and displaying said second information concurrently with the display of said first information, wherein said first information is displayed on said second display in response to a user application executing on said associated computer.*

*51. The interactive device of claim 50, wherein:*

*said key entry device is either a keypad or a keyboard;*

*a pointing device includes a mouse; and*

*an audio input device includes a microphone.*

*52. The interactive device of claim 50, wherein*

*said second information, although different, is related to said first information, and*

*said second information is unessential to the display of said first information.*

*53. An interactive device for use with an associated computer, wherein said associated computer includes a second processor and a second display, and wherein said second display displays first information that dynamically changes, said interactive device comprising:*

*a first display, wherein said second display and said first display are simultaneously viewable by a user;*

*a first processor in communication with said first display;*

*a user input device, in communication with said first processor;*

*means, in communication with said first processor, for displaying on said first display second information, wherein said second information is:*

*dynamically changing with said first information so that when said first information changes, said second information changes in a correlated manner,*

*unessential to the display of said first information, and related to, but different from, said first information.*

*54. The interactive device of claim 53, wherein a user input device is either a key entry device, a pointing device, or an audio input device.*

*55. The interactive device of claim 54, wherein:*

*said key entry device is either a keypad or a keyboard;*

*a pointing device includes a mouse; and*

*an audio input device includes a microphone.*

*56. The interactive device of claim 53, wherein said second information dynamically changes with said first information every time said first information changes.*

*57. The interactive device of claim 53, wherein said second information dynamically changes with said first information at least some of the time when said first information changes.*

*58. A method, comprising:*

*executing an application on a system that includes a second processor, a second user input device, and a second display, and displaying first information related to said application on said second display, where said first information dynamically changes;*

*displaying second information on a first display that is simultaneously viewable by a user with said second display, wherein said first is associated with a device that includes a first processor and a first user input device, wherein said second information is:*

*dynamically changing with said first information so that when said first information changes, said second information changes in a correlated manner,*

*unessential to the display of said first information, and related to, but different from, said first information.*

*59. The method of claim 58, wherein said second information is dynamically changing with said first information every time said first information changes.*

*60. The method of claim 58, wherein said second information is dynamically changing with said first information at least some of the time when said first information changes.*

*61. The method of claim 58, wherein said second information is related to, but different from, said first information in that said second information provides an explanation of said first information.*

*62. The method of claim 58, wherein said second information is related to, but different from said first information in that said second information is supplemental to said first information.*

*63. The method of claim 58, wherein said second information is related to, but different from said first information in that said second information is generated by a separate application from said application executed on said system.*

*64. A method for use by a device having a first display and a first processor, comprising:*

*receiving a signal from a second device that includes a second display and a second processor, where the second device is displaying first information that dynamically changes on said second display;*

*displaying on said first display, which is simultaneously viewable with said second display, second information in response to said signal, wherein said second information is:*

*dynamically changing with said first information so that when said first information changes, said second information changes in a correlated manner,*

*unessential to the display of said first information, and related to, but different from, said first information.*

*65. The method of claim 64, wherein said second information is dynamically changing with said first information every time said first information changes.*

*66. The method of claim 64, wherein said second information is dynamically changing with said first information at least some of the time when said first information changes.*

*67. The method of claim 64, wherein said second information is related to, but different from, said first information in that said second information provides an explanation of said first information.*

*68. The method of claim 64, wherein said second information is related to, but different from said first information in that said second information is supplemental to said first information.*

*69. The method of claim 64, wherein said second information is unessential to the display of said first information in that the processor generating said second information*

*does not control or instruct the second processor in the display of said first information.*

*70. A storage medium for use with a device having a first display and a first processor and having instructions stored thereon, which when executed by said first processor, perform the steps of:*

*receiving a signal from a second device that includes a second display and a second processor, where the second device is displaying first information that dynamically changes on said second display;*

*displaying on said first display, which is simultaneously viewable with said second display, second information in response to said signal, wherein said second information is:*

*dynamically changing with said first information so that when said first information changes, said second information changes in a correlated manner,*

*unessential to the display of said first information, and related to, but different from, said first information.*

* * * * *